April 11, 1933.  J. W. CAIN  1,903,439
WINDOW WIPER
Filed Dec. 7, 1929   2 Sheets-Sheet 1
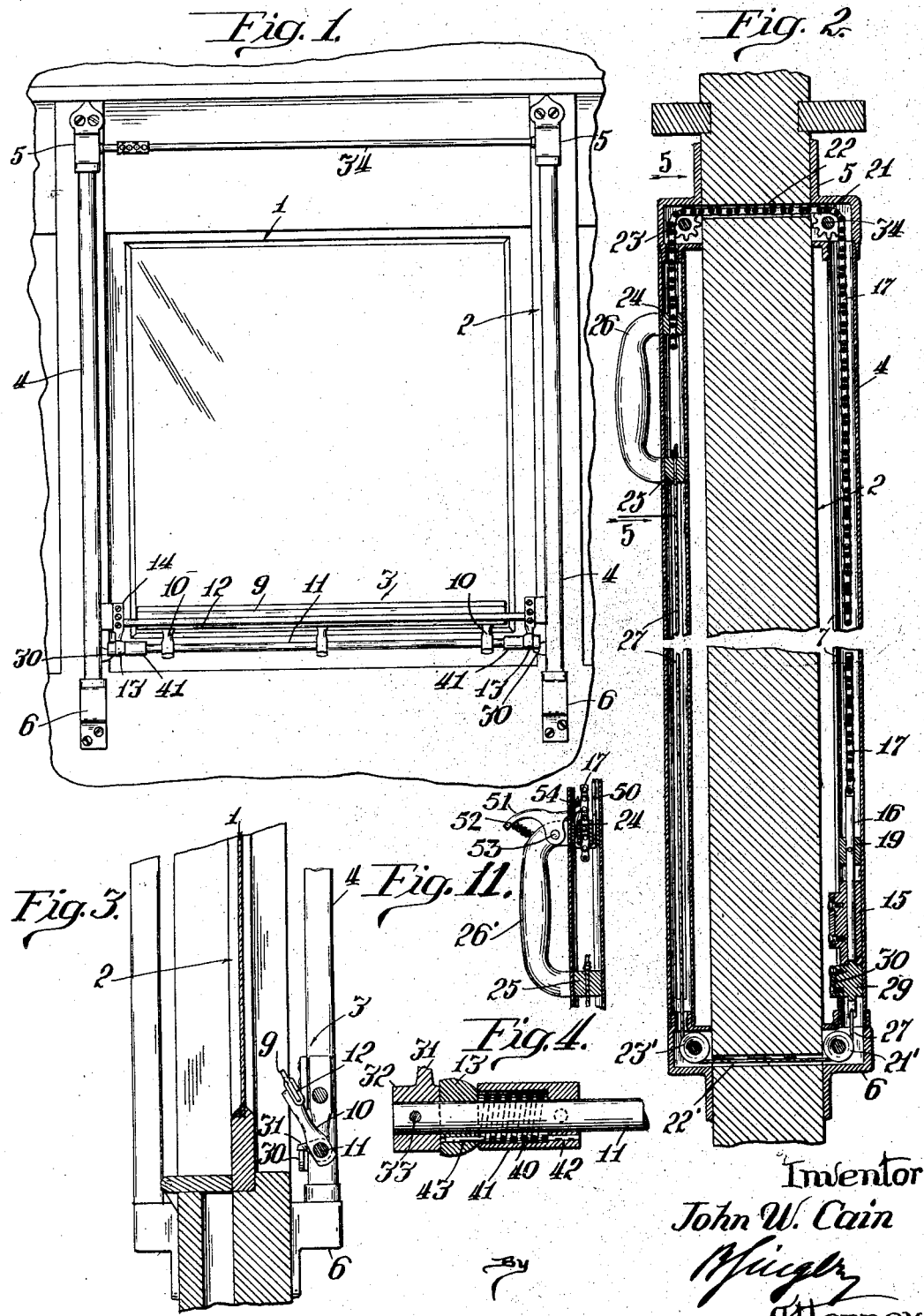
Inventor
John W. Cain

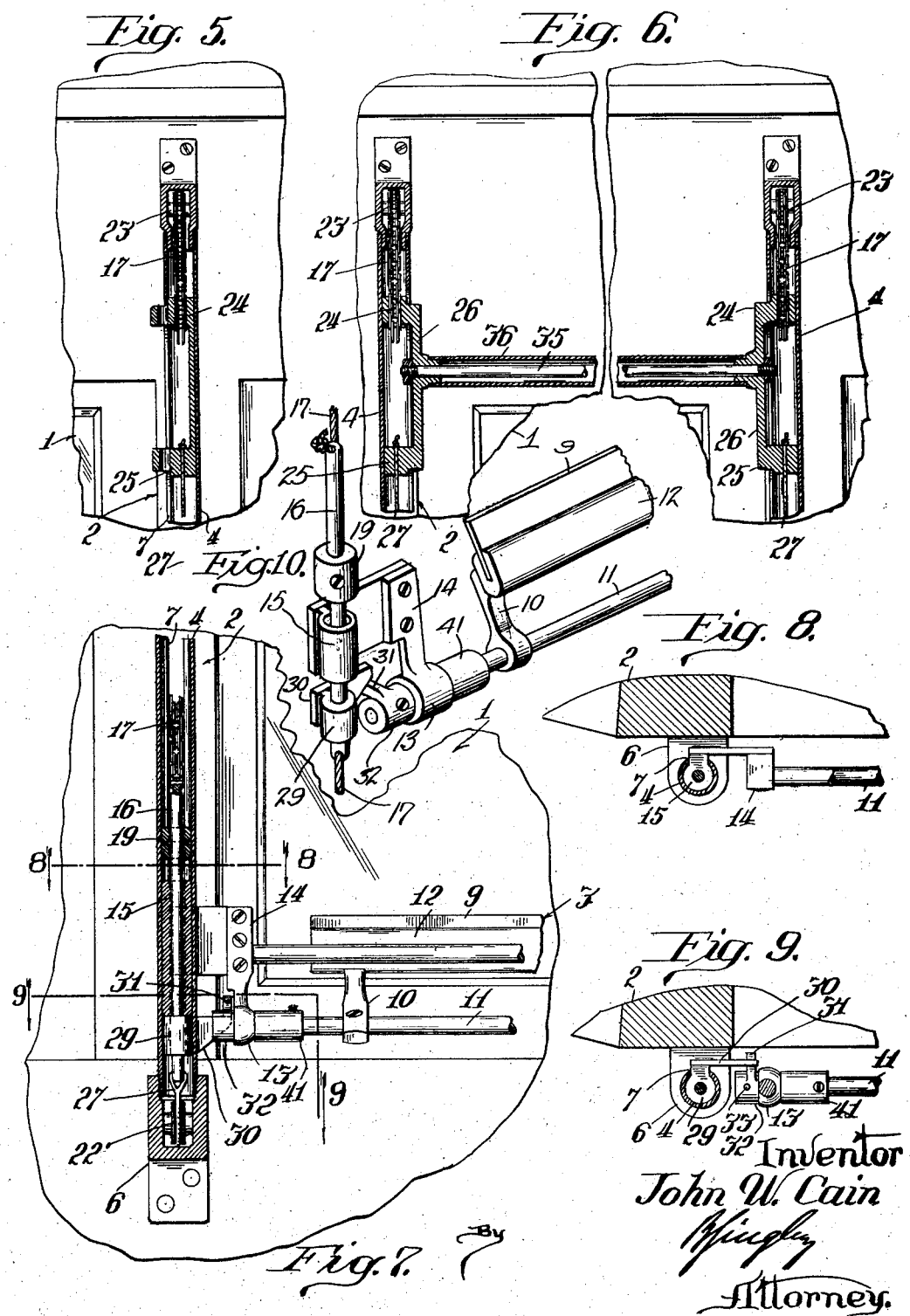

Patented Apr. 11, 1933

1,903,439

UNITED STATES PATENT OFFICE

JOHN W. CAIN, OF CHICAGO, ILLINOIS

WINDOW WIPER

Application filed December 7, 1929. Serial No. 412,370.

This invention relates to window wipers of that type in which the operating means for the wipers are disposed on the inside of the window, while a wiping structure is movably mounted on the outside thereof.

It is an object of the invention to provide a device particularly useful in street-cars and similar conveyances for enabling the motorman to maintain an unobstructed view through the window without compelling him to leave the operating compartment.

Another object of the invention is to provide a device of this type which will not require the installation of fluid pressure actuated contrivances for operating the wiper structure and which, therefore, is less likely to get out of order through excessive fluctuations in temperature or humidity.

It is, furthermore, an object of the invention to provide a device of this character in which a wiping member is automatically applied to the outer surface of the window when the structure is actuated in one direction only, as for instance downward, while upon operation in the opposite direction the wiping element is lifted from the surface of the window pane, but is automatically returned to engagement with said pane when it is again actuated in the first named direction.

It is an additional object of the invention to provide a device of this character which is simple in construction, less costly in installation and safer in operation than devices which have heretofore been suggested for similar purposes.

With these and other objects in view an embodiment of the invention is described in the following specification in which the novel features are pointed out under reference to the accompanying drawings.

In the drawings:

Fig. 1 is a front elevation of parts of the device located on the outside of the window;

Fig. 2 is a transverse sectional view through the device on a larger scale;

Fig. 3 is a detail sectional view of the lower portion of the window frame sash and wiper, certain parts being shown in elevation;

Fig. 4 is a sectional view on certain details of the wiper support;

Fig. 5 is a detail sectional view of the manually actuated operating assembly and its guide;

Fig. 6 is a transverse sectional view on line 6—6 of Fig. 2;

Fig. 7 is a sectional view of the lower portion of the guiding device for the wiper element;

Figs. 8 and 9 are sectional views on lines 8—8 and 9—9 respectively of Fig. 7;

Fig. 10 is a perspective view of certain parts of the apparatus, and

Fig. 11 is a part elevation and part section of a modified actuating device.

The window pane 1 with its sash is mounted in a frame 2 of any desired construction, and a detail description of this mounting may be dispensed with. For the purpose of guiding the wiper structure indicated as a whole at 3 for suitable movement relatively to the pane 1, there are disposed on the exterior of the frame 2, guiding conduits 4 which are secured at the top by brackets 5 and at the bottom by brackets 6 adjacent the longitudinal vertical members of the frame 2. These guiding elements are formed as pipes preferably of circular cross-section, each pipe being slotted longitudinally at 7 on that side which is directed towards the frame 2, as clearly shown in Figs. 8 and 9.

The wiper structure 3 comprises in combination with the squeegee or wiper member 9 a plurality of fingers 10 which are spaced transversely of the window and fixedly connected with a rock shaft 11, the outer ends of the fingers being firmly united with a transverse holder 12 of sheet metal or the like, in which the squeegee 9 is clamped in some suitable way.

The shaft 11 is supported near its ends in bearings 13 which form the lower portions of brackets 14 riveted or fastened in some other way to slide members 15, movable in axial direction within the guides 4, but held against rotation owing to the portion thereon which projects through the slot 7. These slides 15 are frictionally held against axial movement in either direction within the tubes.

These slides 15 are each provided with a longitudinal bore, as shown in Figs. 2 and 7, for receiving loosely therein a rigid element or bar 16, the ends of which are connected with tension members, as for instance with the chains 17. The chains 17 extend from the upper end of each bar 16, and are connected to another more flexible tension element as a cable 18, although the chains 17 alone may be used, or the cables alone may be used as supports for the bars 16. A block 19 is rigidly secured to the bar 16, near the upper end thereof, Figs. 2 and 7, which also may be held against rotation about its axis, by engaging the slot 7, or by means of a key 20 on the interior of the tube. Each cable 18 is guided over a sleeve or pulley 21 within the bracket 5 pertaining to the guide 4, and is then directed through a passage 22 of the frame to be trained on the inner side over another pulley 23 in the companion bracket 5 in the interior of the operating compartment. The end of cable 18 is secured to the actuating device.

The actuating device comprises in each tube 4 in the operating compartments an upper slidable block 24 to which the end of cable 18 is fastened, a lower slidable block 25 and a rigid handle member 26 connecting the two blocks, but located outside the pertaining tube 4, so as to be readily accessible for manual operation. The lower slidable block positively connected through the handle 26 with the upper block 24 serves for the attachment of a tension member 27 which is at its other end secured to the foot of the bar 16. This second tension element also is trained over pulleys 21' and 23' and passes through a bore 22' near the lower end of the frame.

It will be seen, therefore, that upon shifting the handle member 26 up or down in the interior of the compartment, the rod 16 will be moved down or up on the outer surface of the window within the pertaining tube 4, the combined cables 18, 27 forming in fact a single tension member, since they are connected by the rigid actuating device.

The lower portion of the rod 16 is fixedly connected or made integral with the plunger 29 loosely slidable in the outer tube 4 and held against rotation therein by a part projecting through the longitudinal slot 7, similar to the upper block 19. It should be noticed, however, that the slide 15 is loose on the rod, so that a pull on the tension member in either direction does not directly influence said slide.

The lower plunger 29 has a finger 30 projecting through the slot 7 of the tube outward, and laterally thereof, as indicated in Fig. 9, for cooperation with a finger 31 projecting from a collar 32 which is pinned at 33 to the end of the rock shaft 11. The finger 30 of the plunger 29 has a cam edge which engages the finger 31 of the collar 32 when said block is forced downward, and after having acted from above on said collar in its downward movement, it remains in engagement therewith, Fig. 7.

For this purpose the shaft 11, as shown in Fig. 4, is provided with a spring 40 within a casing 41 rigidly secured to shaft 11 and to which one end of the spring is anchored at 42. The other end of the spring is secured at 43 to the bearing 13 on bracket 14. As this bracket 14 is rigidly connected with the slide 15, the end 42 of the spring 40 also is prevented from turning about the axis of the shaft 11, and the spring has a tendency to maintain shaft 11 in a position in which the squeegee is spaced from the window pane.

The two upper pulleys 21 may be connected by means of a transverse shaft 34, Fig. 1, and the handles 26 of the two manipulating devices in the interior of the compartment or vestibule may also be connected by a rod 35 which, as shown in Fig. 6, is enclosed within a tube 36 for better appearance and manipulation. The spring structure including the bracket 14, spring 40, casing 41 and collar 32 provided at each end of the shaft 11, as shown in Fig. 1, whereby upon movement of the plungers 29 against the fingers 31, the shaft 11 will be rocked. The operation, therefore, is as follows:

When the united handles 26 are moved upward in the interior of the room or vestibule, the outer strand of the connected tension members 18, 17, 27 is moved downward, and therefore also the rods 16 will be moved downward in the tubes 4 on the outside of the window. The rods 16 upon moving downward will after a very short travel move their upper blocks 19 into contact with the tops of the slides 15 which then rested at their lower ends on the plungers 29. These plungers are positively moved away at the same time from the slides 15, thereby forcing their cam arms 30 into engagement with the fingers 31 of collars 32 and imparting a rocking movement to shaft 11, so as to apply the squeegee 9 yieldingly against the pane. In the continued downward movement, this relation of slides 15, blocks 19 and plungers 29 is maintained, whereby the pane is wiped. When at any point of the path the force moving the structure downward ceases to be applied, the spring 40 will act to restore the shaft 11 to its "far" position relatively to the pane, and the parts will then occupy the position illustrated in Fig. 7.

If it is desired to repeat the wiping operation, the handles 26 on the inside of the window must again be moved downward, inducing an upward movement of the rods 16 in the outer tubes 4 of the window. The upward movement of the rods 16 and of the plungers 29 associated with the same will lift the slides 15, thereby also moving upward the brackets 14 to which the shaft 11 is secured. During this upward movement, therefore, the wiper structure remains in inoperative position, and it is only upon the occurrence of a predetermined relative movement of the squeegee supports 15 and squeegee applicators 29 that the device becomes operative.

In the modification illustrated in Fig. 11, means are provided for rocking the squeegee holder without necessarily inducing movement of the squeegee up or down along the window. The cable 50 illustrated in Fig. 10 extends over a pulley, not shown, coaxial with the sprocket 23, but rotatable independently thereof, and the lower outer end of the cable which extends parallel to the chain 17 in the outer tube passes loosely through the parts 19 and 15, and is secured to the lower block 29 in any desired way, and therefore not illustrated. The opposite or inner end of this cable is secured to the inner end of a thumb piece 51, as indicated at 54. The thumb piece 51 is pivotally supported on the handle 26' at 53 and is normally held with its outer end upward by a spring 52. When this thumb piece is depressed against the action of the spring, the inner end 54 will exert a pull on the cable 50 and will thereby impart an upward movement to the element 29, inducing a rocking movement of the squeegee support.

I claim:

1. In a device of the character described, the combination of a window wiper structure comprising a squeegee, a rock shaft on which said squeegee is supported, bearing brackets for said rock shaft, slides rigidly connected with said bearing brackets, guiding means on the outside of the window for said slides, rods extending through said slides and carrying enlargements spaced from said slides, means connected to said rods and operable from the inner side of the window for imparting movements to said rods, and enlargements relatively to said slides, and means on one of said enlargements for positively rocking said rock shaft upon movement of the respective enlargement in a predetermined direction.

2. In a window cleaner a rock shaft, a squeegee secured to the rock shaft, a tubular slide connected with the rock shaft, a guide tube for the slide, a tension member passing loosely through the slide in the guide tube, and means on the tension member in the guide tube for forcibly engaging the slide after movement of the tension member has been initiated for moving the slide and rock shaft in either direction from any point of the path depending on the direction of movement of the tension member.

3. In a window cleaner, a rock shaft carrying a squeegee thereon, a slide supported by the rock shaft, a guiding tube for the slide and in which the slide is frictionally maintained at any point of its path, a tension member extending through said guide tube, and blocks fixed on the tension member above and below the slide and at a distance from the ends of the slide, whereby upon movement of said tension member, either of said blocks is caused to engage said slide and shift it from the point of its path to which it has been adjusted and in which it had been frictionally retained.

4. In a window cleaner, the combination of a rock shaft carrying a squeegee thereon, a slide having a longitudinal bore and connected to the rock shaft and guided for movement along a window, a tension member movable relatively to the slide through said bore, a plurality of means fixed on the tension member for engaging said slide and imparting a movement thereto when the tension member is being moved, and a cam element on one of said means coacting with the rock shaft for imparting a rocking movement to said shaft upon movement of said tension member in a predetermined direction.

5. In a window cleaner, the combination of a rock shaft carrying a squeegee thereon, a slide having a longitudinal bore and connected to the rock shaft, a guide tube for the slide at the side of the window, a tension member movable in said tube relatively to the slide through said bore, a plurality of means fixed on the tension member within said tube for engaging said slide and imparting a movement thereto when the tension member is being moved, and a cam element projecting from said tube on one of said means coacting with the rock shaft for imparting a rocking movement to said shaft.

6. In a window cleaner, the combination of a rock shaft having a squeegee thereon, a slide with a longitudinal bore and connected to the rock shaft, means for frictionally retaining the slide and rock shaft at any point of their path, a tension member movable relatively to the slide through said bore, a bracket on said rock shaft, a spring constraining said rock shaft to turn in a predetermined direction, means on the tension member for forcibly engaging the slide to move the same in a predetermined direction upon movement of the tension member in a predetermined direction, and a cam element on said last mentioned means for engaging the bracket on the rock shaft and adapted to impart a turning movement to said shaft against the action of said spring.

7. In a window cleaner, the combination of a rock shaft carrying a squeegee, a bracket through which said rock shaft loosely extends, a slide secured to said bracket, guiding means for said slide and adapted to prevent a turning movement of said bracket about the rock shaft, a tension member passing through said guiding means and movable relatively to the slide, means at a fixed point of the tension member for engaging the slide upon movement of said tension member relatively to the slide, a spring secured to the bracket and surrounding the rock shaft and adapted to constrain said rock shaft to turn in a predetermined direction, a second bracket on the rock shaft, one of said means on the tension member being adapted to engage said second bracket and to impart thereby a turning movement to said rock shaft in a direction opposite to that in which the spring tends to turn the rock shaft.

In witness whereof I affix my signature.

JOHN W. CAIN.